(12) United States Patent
Anoszko et al.

(10) Patent No.: US 12,280,324 B2
(45) Date of Patent: Apr. 22, 2025

(54) FILTRATION MEDIA AND METHOD OF MANUFACTURING FILTRATION MEDIA USING NANOFILM

(71) Applicant: RESEARCH PRODUCTS CORPORATION, Madison, WI (US)

(72) Inventors: Thomas J. Anoszko, Verona, WI (US); Gajanan Subray Bhat, Watkinsville, GA (US); Collin D. Anderson, Chicago, IL (US); William H. Hofmeister, Nashville, TN (US); Qin Sun, Clarksville, TN (US); Jatin Champaklal Khanpara, Saint Joseph, MN (US); Guolian Wu, Saint Joseph, MN (US)

(73) Assignee: Research Products Corporation, Madison, WI (US)

( * ) Notice: Subject to any disclaimer, the term of this patent is extended or adjusted under 35 U.S.C. 154(b) by 0 days.

(21) Appl. No.: 18/229,002

(22) Filed: Aug. 1, 2023

(65) Prior Publication Data

US 2024/0042356 A1    Feb. 8, 2024

Related U.S. Application Data

(60) Provisional application No. 63/394,878, filed on Aug. 3, 2022.

(51) Int. Cl.
*B01D 39/16* (2006.01)
*D04H 1/46* (2012.01)
*D04H 5/02* (2012.01)

(52) U.S. Cl.
CPC .......... *B01D 39/1607* (2013.01); *D04H 1/46* (2013.01); *D04H 5/02* (2013.01); *B01D 39/1692* (2013.01);
(Continued)

(58) Field of Classification Search
CPC .......... D04H 1/46; D04H 3/102; D04H 3/105; D04H 5/02; D04H 1/4374; D04H 13/005; D04H 18/02; D04H 1/498; D04H 3/016; B01D 2239/0659; B01D 39/1607; B01D 39/1692; B01D 2239/10; B01D 2239/125; B01D 39/18; B01D 39/2017;
(Continued)

(56) References Cited

U.S. PATENT DOCUMENTS 3,511,740 A * 5/1970 Sanders .................... D04H 1/48
442/352
5,318,831 A * 6/1994 Hirama .................... B32B 5/022
55/486

(Continued)

FOREIGN PATENT DOCUMENTS

KR         101544720 B1 *  8/2015
KR      20200030799 A  *  3/2020

*Primary Examiner* — Amy Vanatta
(74) *Attorney, Agent, or Firm* — Foley & Lardner LLP

(57) ABSTRACT

The present application is direction to a system and method for preparing filter media from macro and nanofibers by ventilating a nanofiber media, combining the nanofiber media with macro fibers to form a hybrid media, inserting the hybrid media between a stitching plate and a stripper plate and alternatively inserting and withdrawing needles to combine the macro fibers with the nanofiber media and create a fiber web along at least one surface of the nanofiber media.

13 Claims, 7 Drawing Sheets

(52) U.S. Cl.
CPC .. *B01D 2239/0659* (2013.01); *B01D 2239/10* (2013.01); *B01D 2239/125* (2013.01)

(58) Field of Classification Search
CPC .......... B01D 39/1623; B01D 2239/025; B01D 2239/1225; B01D 2239/1233
USPC .................................................. 28/107–115
See application file for complete search history.

(56) References Cited

U.S. PATENT DOCUMENTS

| | | | | |
|---|---|---|---|---|
| 5,508,080 | A * | 4/1996 | Sorimachi | B32B 7/027 428/920 |
| 8,241,543 | B2 * | 8/2012 | O'Donnell | B29D 7/01 425/290 |
| 8,303,693 | B2 | 11/2012 | Leung | |
| 9,142,815 | B2 * | 9/2015 | Lee | H01M 50/44 |
| 9,242,406 | B2 * | 1/2016 | Coe | B29C 55/18 |
| 2007/0218279 | A1 * | 9/2007 | Nonaka | D04H 1/43838 977/840 |
| 2008/0274658 | A1 * | 11/2008 | Simmonds | D04H 1/4374 28/112 |
| 2010/0129592 | A1 * | 5/2010 | Nishimura | D04H 1/435 28/103 |
| 2012/0040581 | A1 | 2/2012 | Kim | |
| 2014/0014573 | A1 * | 1/2014 | Hosoya | D04H 3/03 210/491 |
| 2014/0116945 | A1 * | 5/2014 | Kas | B01D 69/02 210/651 |
| 2014/0287230 | A1 | 9/2014 | Walls et al. | |
| 2021/0236971 | A1 * | 8/2021 | Umebayashi | B01D 39/1623 |
| 2022/0347343 | A1 * | 11/2022 | Hofmeister | A61F 2/08 |
| 2023/0032052 | A1 * | 2/2023 | Hofmeister | B01D 39/1623 |
| 2023/0311036 | A1 * | 10/2023 | Hofmeister | B01D 39/1607 210/500.1 |

* cited by examiner

100

110
Insert nanofiber media into a first needling cavity.

120
Puncture nanofiber media.

130
Withdraw needles from nanofiber media

140
Align fibers along nanofiber media to form hybrid media

150
Insert hybrid material between a stripper plate and a stitcher plate

160
Needle-pierce the hybrid material

170
Withdraw the needles, adhering macro fibers to the nanofiber media.

Fig. 1

FILTRATION MEDIA AND METHOD OF MANUFACTURING FILTRATION MEDIA USING NANOFILM

CROSS-REFERENCE TO RELATED APPLICATION

The present application claims priority to U.S. Provisional Patent Application No. 63/394,878 filed Aug. 3, 2022, the entire contents of which are incorporated herein by reference.

BACKGROUND

The present application relates generally to the field of filtration. More specifically, the present disclosure relates to methods for preparing nanofiber media for use as filter media.

SUMMARY

One embodiment of the present disclosure is a method of preparing filter media. The method includes inserting one or more layers of a nanofiber media between an upper surface and a lower surface, wherein the upper surface and the lower surface are configured to receive a first plurality of needles. The method includes piercing the nanofiber media with a plurality of needles. The method includes withdrawing the first plurality of needles. The method includes aligning macro fibers along a first surface of the nanofiber media to create a hybrid media. The method includes inserting the hybrid media between a stripper plate and a stitcher plate. The method includes piercing the hybrid media with a second plurality of needles. The method includes withdrawing the second plurality of needles. A combination of the piercing of the hybrid media and the withdrawing from the hybrid media can include catching, by the plurality of needles, macro fibers. A combination of the piercing of the hybrid media and the withdrawing from the hybrid media can include combining, by the plurality of needles, the macro fibers with the nanofiber media.

Another embodiment of the present disclosure is a method of preparing filter media. The method includes inserting one or more layers of a nanofiber media in a perforation target area. The method includes perforating the nanofiber media within the perforation target area. The method includes aligning macro fibers along a first surface of the nanofiber media to create a hybrid media. The method includes inserting the hybrid media between a stripper plate and a stitcher plate. The method includes piercing the hybrid media with a plurality of needles. The method includes withdrawing the plurality of needles. The piercing of the hybrid media and the withdrawing from the hybrid media can include catching, by the plurality of needles, macro fibers. The piercing of the hybrid media and the withdrawing from the hybrid media can include combining, by the plurality of needles, the macro fibers with the nanofiber media.

Another embodiment of the present disclosure is a method of preparing filter media. The method includes inserting one or more layers of a nanofiber media in a perforation target area. The method includes perforating the nanofiber media within the perforation target area. The method includes aligning macro fibers along a first surface of the nanofiber media to create a hybrid media. The method includes inserting the hybrid media between a stripper plate and a stitcher plate. The method includes piercing the hybrid media with a plurality of needles. The method includes withdrawing the plurality of needles. At least a combination of the piercing of the hybrid media and the withdrawing from the hybrid media includes catching, by the plurality of needles, macro fibers. At least a combination of the piercing of the hybrid media and the withdrawing from the hybrid media includes combining, by the plurality of needles, the macro fibers with the nanofiber media.

BRIEF DESCRIPTION OF THE DRAWINGS

FIG. 1 is a flow diagram of a method of preparing a nanofiber media for use as filter media according to an embodiment of the present disclosure.

DETAILED DESCRIPTION

Figure 2:
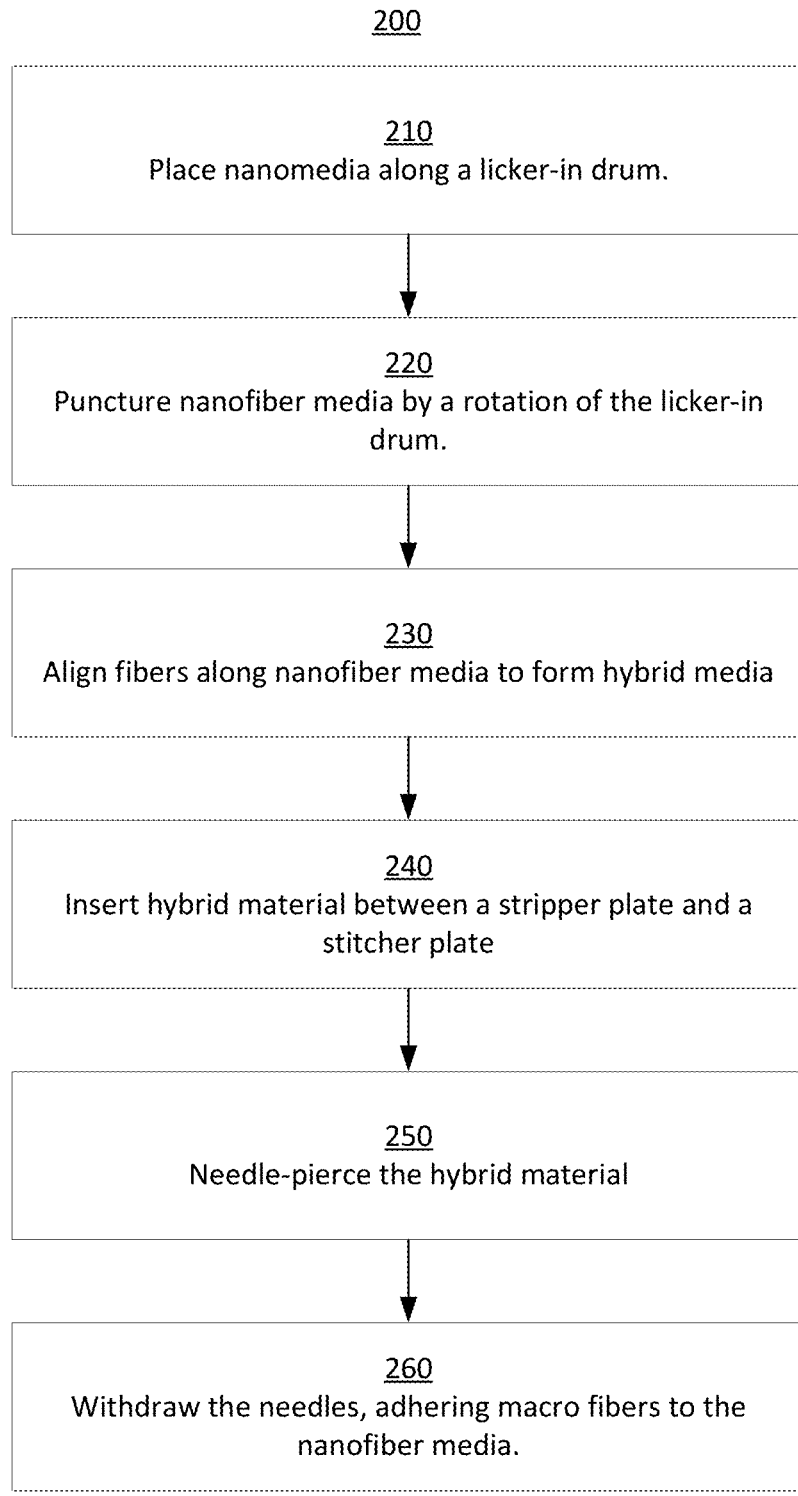
FIG. 2 is another flow diagram of a method of preparing a nanofiber media for use as filter media according to an embodiment of the present disclosure.

Filter media is often composed of fibers. The efficiency of a filter (which may be described as the portion of particles of a particular size filtered relative to total number of particles entering the filter), may relate to the size and spacing of these fibers. For example, small fibers, with small spaces between them may better capture small particles, and thus result in higher filter efficiencies for small particles. Small particles, including dust, viruses, bacteria, dander, etc., are a substantial contributor to air quality. Thus air filters, for example, may benefit from a reduction in fiber size used and a related reduction in the distance between those fibers.

Although some methods may economically and reliably create very-small fibers, termed "nanofibers," in at least some instances, those nanofibers may be disposed along a film layer as a part of production. In some circumstances, the film layer may be unsuitable for use in air filtration due to, for example, a resistance to airflow. Selectively ventilating the film may enable adequate airflow for at least some filtering applications, while maintaining adequate nanofibers to maintain suitable filtering performance.

Many filters, such an indoor residential or commercial air filters may be designed to filter a large variety of particle sizes, and may benefit from the inclusion of relatively large fibers. Large fibers may create a gradient of particle capture through the depth of the filter, with larger particles generally becoming trapped in the larger fibers, and smaller particles being caught in the smaller fibers (such as nanofibers) disposed opposite the larger fibers. Such a gradient may maintain better airflow throughout the filter by dispersing the trapped particles, which may block airflow, through the depth of the filter. Additionally, combining nanofibers with larger fibers may allow a filter to achieve similar, or even superior filtration more economically. Further, some macro fibers may not be disposed along film sheets that may restrict airflow. Thus, a hybrid filter comprising both macro fibers, and nanofibers disposed along a film, may combine the filtration of the nanofibers with other benefits of traditional fibers, such as cost and strength.

In some instances, the fibers may be removed from the film prior to their use, or may be operated without altering the film, such as by passing air along the horizontal surface of the film. In at least some instances, however, the film may be ventilated to allow the passage of air through the film, and allow the nanofibers to filter the air. In some instances, the nanofibers of a single film may provide adequate filtration; in other instances, a plurality of films may be combined to provide additional filtration. For example, nanofibers may be intentionally removed from the film (e.g., shaved), a film may be mechanically separated to provide additional nanofibers (e.g., via a needle/punch-out process, cutting, etc.). For example, the a process that perforated the film may result in various waste comprising nanofibers; such nanofibers may be harvested (with or without the film) and included in various filtering applications, such as to increase the filtering performance of a filter by combining them into a mesh of other fibers.

In one embodiment, a nanofiber is a fiber which is greater than 1 nm and less than 1000 nm. For example, a nanofiber may be of a diameter between 1 and 500 nm, and may have a length of at least 10 times its diameter. In another embodiment, a nanofiber may be between than 200 nm and 500 nm in diameter, with a length of at least 8 times its diameter. Nanofiber media shall mean a plurality of nanofibers disposed along a film (e.g., an assembly formed by a chillcasting process). A nanohole according to such an embodiment may be a void which is at most 0.5 µm in diameter, and has a length of at least 10 times its diameter. A macro fiber according to such an embodiment is a fiber having a minimum diameter of greater than 0.5 µm in diameter, but which may have a diameter of 10 µm or more. The principle nanofiber media refers to the largest remaining portion of nanofiber media after the removal of a portion thereof. A hybrid media is a nanofiber media in combination with a plurality of macro fibers, which may or may not be combined with the nanofiber media. This combination may be created by passing the macro fibers through the nanofiber media, or other methods which may join the macro fibers with the film layer. A needle is a generally rigid member which punctures the nanofiber media, so as to ventilate the material or to combine macro fibers with the media.

As one skilled in the art will understand, upper and lower are defined relative to an entry position of a needle in a described embodiment, and is not intended to describe a position relative to gravity, another item, etc. Some embodiments of the present disclosure may comprise needles which may enter the cavity from multiple directions, or surfaces, and may comprise complex surfaces in which case, words like "upper" and "lower" may be specific to each needle; the recitation of a generally flat or cylindrical "upper" surface, and a generally flat or cylindrical "lower" surface is provided in order to clearly describe an embodiment of the present disclosure, and should not be presumed to be limiting. As one skilled in the art will understand, the present disclosure may be practiced with various orientations and shapes, each being associated with various advantages and disadvantages.

FIG. 1 is a flow diagram of a method of preparing nanofiber media for use as filter media according to an embodiment of the present disclosure. At operation 110, the nanofiber media is inserted into a needling assembly. Some embodiments may be configured to receive a plurality of nanofiber media, which may accelerate the ventilation process and enable filters using a plurality of layers of nanofiber media. The needling assembly may comprise a cavity disposed between two surfaces. For example, an upper surface may be a stripper plate having a plurality of receiving holes for needles, and may be configured to maintain the nanofiber media below a surface of the stripper plate facing the cavity (i.e., the upper surface of the cavity). The lower surface may be a stitching plate which may be configured to maintain the nanofiber media above the surface of the stripper plate. In some embodiments, the stripper or stitcher plates may be a generally flat surface (e.g., steel plate), and the cavity between them may be generally rectangular. In some embodiments, the cavity may be disposed between two drums, at least one of which may be rotated to pull in the nanofiber media. In some embodiments, the cavity may be of a variable size. For example, where the cavity is defined by the space between two drums, gravity, a tension bar, or a spring element may press the two drums together so that the cavity is of negligible dimension, but upon the insertion of material, the cavity may expand to accept the material according to the properties (compressibility, ease of tearing, elasticity, etc.) of the material and the strength of the spring force.

At operation 120, the nanofiber media is punctured by a plurality of needles to ventilate the media. In some embodiments, the needles (e.g., sharp or blunt tip) may deform the nanofiber media film to create the ventilation. Other embodiments may make use of needles (e.g., flat top or cylindrical) designed to remove material, as in a stamping press, or that combine needles of multiple types, or needles having characteristics of multiple types. Some embodiments may use a hot needle process, which relies on a heated needle to melt the nanofiber media instead of or in addition to mechanical forces. Some embodiments may include a stripper plate. In one embodiment, the upper surface of the cavity may be configured to receive one or more needles, which may enter the needling assemble cavity through a plurality of associated needle passages in an upper surface defining the needling cavity, wherein the upper surface is formed by a generally flat sheet of material (e.g., steel, cast-iron, plastic, etc.), and be controlled by, for example, a reciprocating motor. In some embodiments, the force of the needles may displace the nanofiber media a downward direction. This displacement may be arrested by a lower surface of the cavity (e.g., a stitching plate) which may, in some embodiments, be configured to receive needles through needle passageways so that the needles may continue their travel through the nanofiber media and beyond the cavity. In some embodiments, these passageways continue through a bottom surface of the cavity (e.g., the stitching plate) which may, advantageously, allow for the expulsion of any removed material, and allow visual inspection of the puncturing process. In some embodiments, the passageways may not pierce the lower surface (i.e., may consist of divots in the lower surface) which may, advantageously, enable greater retention of nanofibers within the cavity.

In operation 130 the needles are withdrawn from the nanofiber media. In some embodiments, the withdrawal of the needles may displace the nanofiber media against an upper surface of the cavity, which may aid in the withdrawal of the needles. For example, if the needles comprise barbs, a stripper plate may aid the removal of the needles from the media, which may include enlarging the perforated holes by the barbs. Similarly, non-barbed needles may also bind to the nanofiber media (e.g., by friction) and may, by the use of an upper surface (e.g., a stripper plate), withdraw the needles from the nanofiber media.

At operation 140, macro fibers (e.g., non-woven macro fibers) are aligned along the nanofiber media to form a hybrid media consisting of both nanofibers and macro fibers. The macro fibers are placed generally parallel to the surface of the nanofiber media, where the surface is defined by the surface of the nanofilm. Fibers may or may not be homogenously disposed, and may be generally parallel for only a portion of a fibers length, or for a component of the direction (e.g., a fiber which is disposed approximately 45° from the surface of the nanofiber media is parallel with the nanofiber media for a portion of its directional vector, and perpendicular for another portion of its directional vector). For example, glass, cellulose, and synthetic plastic fibers may be disposed along the surface of a nanofiber media. In some embodiments, the nanofiber media may be disposed between similar amounts of macro fibers, which may, advantageously, minimize the distance the macro fibers need to be displaced to be combined with the nanofiber media.

Some embodiments may dispose all or a substantial majority of the macro fibers on one side of the nanofiber media. Advantageously, this may enable a filtering gradient in a final filter (e.g., macro fibers may filter larger particles which may prevent them from blocking, ventilations in the nanofiber media, or the nanofibers themselves), which may lead to an increased service life of a filter, and increase its filtering efficiency and airflow. Such a design may also enable cleaning of the nanofibers, and simplify the later combining of the macro fibers with the nanofiber media.

At operation 150, the hybrid media is placed into a cavity. In some embodiments, the cavity may be the first needling assembly of operation 110. Advantageously, this may minimize the equipment needed to perform the disclosed method 100. In other embodiments, the cavity may be separate, which may, advantageously, allow for the cavity, needles, etc. to be optimized for each of the operations of 110 and 150. Some embodiments, may use the same cavity, but use different needles or differently adjusted needles. In an embodiment using the same cavity, the nanofiber media may remain in the cavity during operations 110 and 150, or it may be removed for combination with the macro-fibers and reinserted as a hybrid assemblage of nanofiber media and macro fibers. Similarly, embodiments using a different cavity may combine the nanofiber media with the macro fibers in within the cavity, or a hybrid assemblage may be placed into the cavity.

At operation 160, the hybrid media is pierced with needles having one or more barbs configured to catch macro fibers, which may thereafter be passed through the nanofiber media, and may therefore become combined with the nanofiber media. Further, macro fibers (which may or may not be combined with the nanofiber media) may become entangled with other macro fibers such that macro fibers not directly combined with the nanofiber media may, nonetheless, become entangled within a fiber web generally disposed along the plane of the nanofiber media. For example, a portion of macro fibers may be disposed perpendicular to the surface of the nanofiber media, and may, as a result, stand little chance of being caught by barbs of needles (if those needles pierce the nanofiber media perpendicularly). However, if sufficient surrounding fibers are caught by the barbs of the needles and combined with the nanofiber media, the generally perpendicular fibers may be secured by entanglement with a surrounding fiber web.

In some embodiments, the various barbs may be configured to catch the macro fibers in a single direction of travel. In one example, where all or a substantial majority of the macro fibers are disposed along a single surface of the nanofiber media, the barbs may be configured (e.g., may be pointed and hook shaped, to catch fibers in one direction of travel, and non-hooked and smooth along another direction) to catch the macro fibers and push them towards the nanofiber media. In another example, the nanofiber media may be disposed between two generally equal quantities of macro fibers, and may also make use of barbs configured to catch macro fibers in one principle direction. In such an embodiments, macro fibers on one side of a nanofiber media may be combined with the nanofiber media, while fibers on the other side of the nanofiber media may be entangled with fibers (e.g., nanofibers of the nanofiber media, macro fibers which have been passed through the nanofiber media, etc.) to maintain their position. In some embodiments comprising macro fibers on both sides of a nanofiber media, this may result in macro fibers on one side of a nanofiber media becoming are more securely combined with the nanofiber media than macro fibers on the other side of the nanofiber media. In such embodiments, the more securely combined fibers may be intended to be disposed on the side of the nanofiber media in the distal direction of the airflow, which may, advantageously, minimize fiber shedding during operation. Alternatively, the less securely combined fibers may be placed on the distal direction of the airflow, which may avoid fouling the filter with fibers during operation.

Some embodiments may include separate barbs configured to pass the macro fibers through the nanofiber media in each direction, which may more securely combine macro fibers along each surface of the nanofiber media. Some embodiments may make use of dual directional barbs which may, in some embodiments, be configured asymmetrically to catch macro fibers of a different size in each direction. Such embodiments may better secure, for example, larger macro fibers along one side of nanofiber media, and relatively smaller macro fibers along the other side. Alternatively or in addition, some needles may be configured with downward facing barbs, and other needles may be configured with upwards facing barbs to combine macro fibers with the nanofiber media.

Although passing the macro fibers though the nanofiber media may block a portion of the airflow through any holes created, this process may further ventilate the nanofiber media because some needles may not catch macro fibers on at least some passes through the nanofiber media to create additional ventilating holes, and because macro fibers disposed within holes in the nanofiber media may allow greater airflow than the nanofiber media layer without any holes, even where holes without macro fibers may provide greater airflow still. In some embodiments, operation 170 may be performed contemporaneously, or alternatively, with operation 120.

At operation 170, the needles are withdrawn from the nanofiber media. In some embodiments, (e.g., where barb points face the upper surface of the cavity) withdrawing the needles may combine the macro fibers with the nanofiber media to a greater extent than the initial piercing of the nanofiber media. In other embodiments, due to the geometry of the barbs, the composition of the macro fibers, etc., withdrawing the needles may combine the macro fibers to a lesser extent. Withdrawal of the needles may displace the hybrid media upwardly, which may be arrested by a stripper plate disposed on an upper surface of the cavity. In some embodiments, the plurality of needles may move in phase, which may simplify the operation of the machine, in other embodiments, some of the plurality of needles may be operating on different phases (e.g., some needles may be performing operation 160 while other needles are performing operation 170, or they may be otherwise out of phase). Such out of phase operation may affect the entanglement of macro fibers, according to the macro fibers used and the phase parameters, for example, operating out of phase may increase entanglement, leading to a denser or more secure fiber web.

FIG. 2 is flow diagram of another method 200 of preparing a nanofiber media for use as a filter media according to an embodiment of the present disclosure. The described embodiment ventilates a nanofiber media by use of a licker drum with a plurality of teeth disposed along its surface, and combines macro fibers with the nanofiber media by use of a needling process. In some embodiments, the teeth may be symmetrical, such as generally cylindrical teeth extending generally perpendicular from the surface of the licker drum, and may comprise tips which are pointed, blunt, flat, hollow, etc., which may ventilate the nanofiber media. In some embodiments, the teeth may be asymmetrical, and/or may not extend generally perpendicular to the surface of the cylinder. For example, the teeth may be oblong or saw tooth shaped.

At operation 210, the nanofiber media is placed along the licker drum. In some embodiments, this operation may comprise an alignment of the nanofiber media with the licker drum that results in the teeth of the licker-in drum avoiding (or minimizing) the destruction of various nanofibers of the nanofiber media, or the separation of those nanofibers from the nanofiber media. Other embodiments may minimize loss of the nanofibers, even where those nanofibers may become separated from the original nanofiber media (e.g., by the removal of a portion of the nanofiber media having the nanofibers disposed along it). For example, the nanofiber media may be oriented to maintain the removed portions along the surface of the nanofiber media, or may collect the removed portions of the nanofiber media for later use in another operation. In another example, the removed portions of nanofiber media may be placed between the principle nanofiber media and the macro fibers which may then be combined with the principle nanofiber media by, for example, a needling operation 250, in order to trap the separated portion of the nanofiber media between the macro fibers and the principle nanofiber media.

At operation 220, the teeth may advance the nanofiber media along the drum. In some embodiments, a separate feeder, such as a tension wheel or bar may hold the nanofiber media taut while the rotation of the teeth of the licker drum advances the nanofiber media. In some embodiments, the licker drum may be disposed against an additional drum, wheel, or flat surface, which may be held in contact by, for example, gravity or a spring force, and the rotation of the licker drum may advance the nanofiber media along the face of the licker drum. The teeth may ventilate the nanofiber media as it passes along the face of the licker drum. In some embodiments, the nanofiber media may be passed along the face of the licker drum repeatedly, or may be passed over a plurality of drums. In some embodiments, another drum, bar, plate, etc. may direct the nanofiber media toward the licker drum. That other drum, bar, plate, etc. may be configured to receive the teeth of the licker drum, to allow the teeth to be inserted and withdrawn from the nanofiber media without causing an undesired displacement of the nanofiber media.

At operation 230, fibers are aligned along the surface of the nanofiber media. As in operation 140, fibers not combined with the nanofiber media, such as non-woven macro fibers, are aligned generally parallel to the surface of the nanofiber media to form a hybrid media. In some embodiments, the fibers may be passed over the licker drum in conjunction with the nanofiber media. In other embodiments, the macro fibers may be introduced during another operation. For example, some macro fiber media may be constructed to allow the passage of air without needling, or a similar operation, and may be introduced during a later operation, such as an operation disposing the macro fibers between a mesh material and/or nanofiber media.

At operation 240, the hybrid media is placed between a stripper plate and a stitcher plate. In some embodiments, the stripper and stitcher plates may be the outer surfaces drums, which may be similar to the licker drum. In other embodiments, the stitcher and stripper plates may be flat. At operation 250, the nanofiber media are pierced by a plurality of needles, which may be cycled by a reciprocating motor, or the rotation of a drum. This operation may occur in a needling cavity, similar to operation 110, or otherwise, such as along the face of the licker-in drum. At operation 260, the needles are withdrawn, catching at least a portion of the macro fibers in needle barbs, and combining them with the nanofiber media to create a fiber web suitable for filtering. Like operation 250, this operation may take place in a needling cavity, or elsewhere.

In some embodiments, the disclosed method 200 may be separated into various batch processes, or may be operated continuously, such as by continually passing nanofiber media and macro fibers over a series of drums to process the material into a filter. For example, the needling process may be performed along the outer surface of a drum, and may operate continuously, or the drums may be configured to pause briefly while the needles pierce the hybrid media at operation 250 in order to enable generally continuous operation. Some processes may be repeated or skipped, for example, some embodiments may require the needles to puncture and withdraw from the nanofiber media several times.

Figure 3:
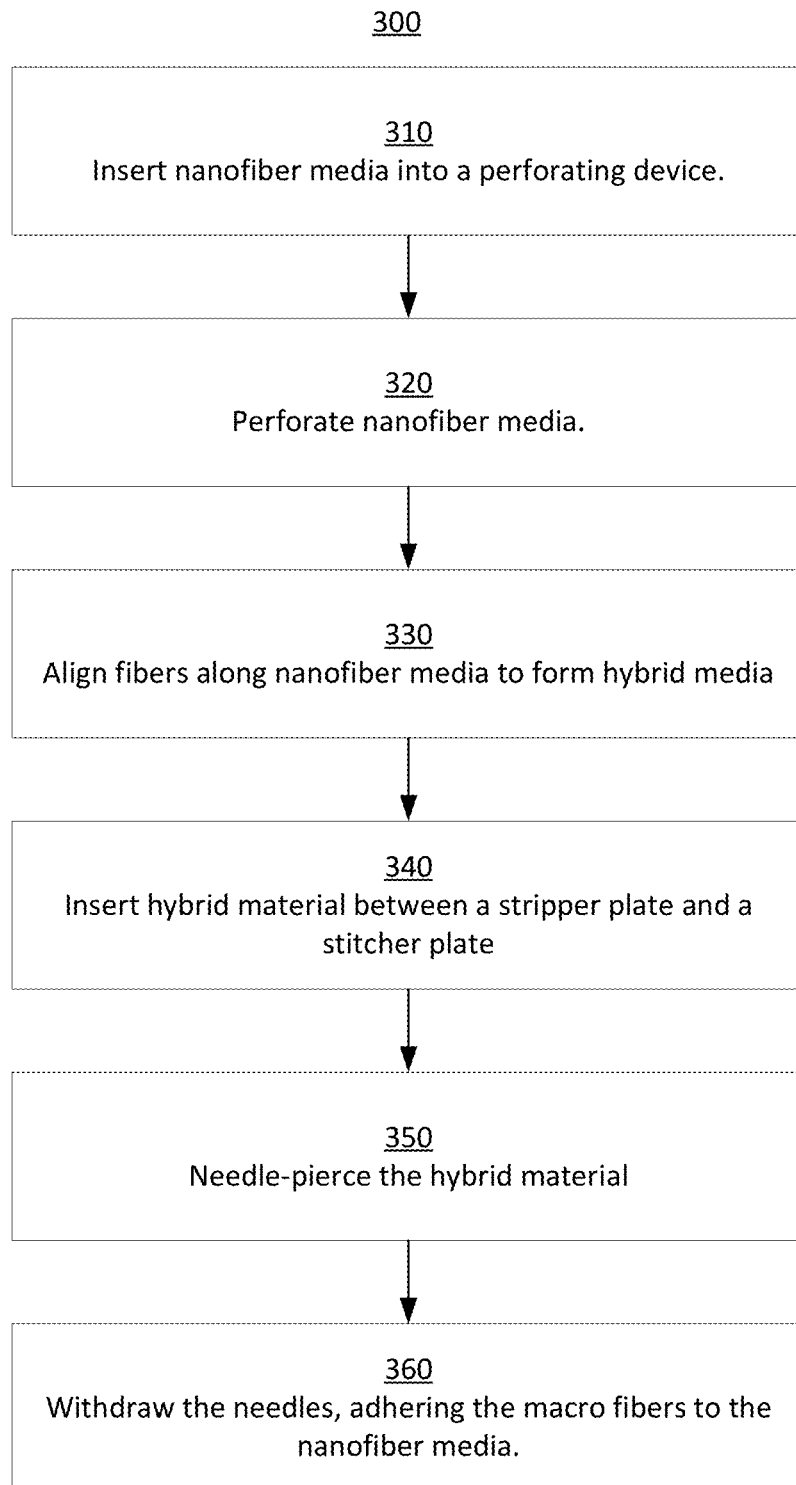
FIG. 3 is yet another flow diagram of a method of preparing a nanofiber media for use as filter media according to an embodiment of the present disclosure.

FIG. 3 is yet another flow diagram of a method 300 of preparing a nanofiber media for use as a filter media according to an embodiment of the present disclosure. At operation 310, the nanofiber media is placed into a perforation target area to create a plurality of ventilations in the nanofiber media. Some embodiments may use direct contact with a heat element, which may include an intermediate thermally conductive material, such as a needle or rod that physically contacts the nanofiber media, such as heated elements on the surface of a drum. Other embodiments may create the perforations without direct contact with a heating element, such as by lasers, or jets of hot air. One skilled in the art will understand that that such perforations may also be formed from water jetting, lensed light, or other techniques. For example, the heating element may be a resistive heater connected to a plurality of nozzles in the case of air jets, or may be a laser diode in the case of laser perforating. In some embodiments, the perforation target area may be enclosed, such as for the protection of users from hot surfaces, jets of air, or high intensity lasers. In other embodiments, the perforation target area may not be enclosed. Some embodiments may comprise a moving perforation target area, such as a conveyer belt or drum which may transport media to be perforated, and may contain perforating devices (e.g., lasers, thermal pads, etc.). The perforation operation 320 may be accomplished by the use of laser light, heating of portions of the nanofiber media to create voids in the material which may allow for ventilation, etc. Perforations may be made by the removal of material (e.g., combustion, separation, etc.); alternatively or additionally, perforations may be made without the removal of material, such as where the nanofiber media is melted to open perforations. One skilled in the art will understand that the laser light or heat source may be adjustable, adjusted, or designed to remove material of a size and shape to optimize airflow, for example, some embodiments may have a hole size of 500 nm to 300 micron, with in excess of 500 holes per square inch. One skilled in the art will appreciate that hole size and density may vary according to a desired filtering efficiently, airflow, etc.

In some embodiments, a cooling or material removal process may follow or coincide with operation 320, in order to prepare the nanofiber media for further processing. For example, if removed portions of the nanofiber media were melted, those portions may need to be removed, and the principle nanofiber media may need to be cooled before completing operation 330, where macro fibers are aligned with the nanofiber media, at least a portion of which are disposed generally parallel to the surface of the nanofiber media.

At operation 340, the hybrid media may be placed between a stripper and stitcher plate which may be similar or dissimilar to that disclosed for use with operations 150 and 240. In some embodiments, the hybrid media, or the nanofiber media portion of the hybrid media may be aligned (e.g., to aid later processing or to minimize damage to the nanofibers). For example, a plurality of perforations may be configured to mate with receiving teeth, which may be disposed along the periphery of a drum or the edge of a stripper plate to align the hybrid media with a needling assembly.

At operation 350, the hybrid media is pierced by a plurality of needles, which may displace the hybrid media towards or against the stitching plate, and may combine macro fibers of the hybrid media with the nanofiber media. Operation 360 withdraws those needles, displacing the hybrid media against the stripper plate, and combining the macro fibers with the nanofiber media with barbs or another structure for catching macro fibers and transporting them through the nanofiber media.

Figure 4:
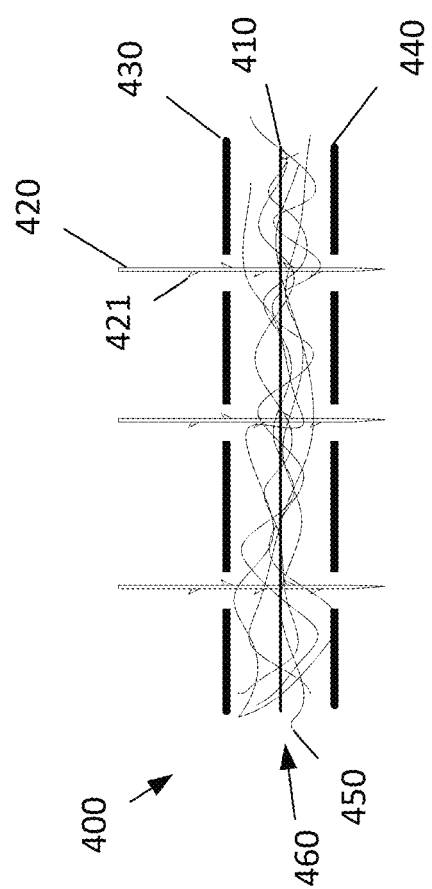
FIG. 4 is a cross-sectional view of a needling assembly according to an embodiment of the present disclosure.

FIG. 4 is a cross-sectional view of a needling assembly 400 according to an embodiment of the present disclosure. A nanofiber media 410 may be disposed within the needling assembly 400, such as within a cavity, and may contain nanofibers disposed along one or more surfaces of a film layer of the nanofiber media 410. The cavity may receive one or more needles 420. One surface of the cavity, termed an upper surface merely for convenience of description, may be bounded by a stripper plate 430 which may be a generally flat surface, the edge of a drum, or another shape. The stripper plate may be composed of a generally solid material, a mesh, etc. The stripper plate may contain a passage to allow a needle 420 to pass into the cavity. The stripper plate may also comprise additional gaps or voids, such as to allow for inspection, reduce material weight/cost, allow for additional process operations, such as laser or hot jet ablation, etc. In some embodiments, a plurality of stripper plates, or an adjustable stripper plate may be used for one or more processing operations (e.g., a material which is movable with different portions to allow for different tasks (e.g., ventilating and combining), such as an oversized flat surface of a rigid material, or a plurality of portions which may be stacked, rolled, etc.). The stripper plate could be a complex shape which allows the needles to enter the nanofiber media from multiple directions, or a single direction, a generally planar surface, etc.

The needles 420 may pass through a lower surface of the cavity, as bounded by a stitcher plate 440 which, like the stripper plate 430, is pictured as generally planar and rigid, but may a drum, semi-rigid or non-rigid, another shape, etc. The stitcher plate 440 is shown with a plurality of passages to allow the plurality of needles to pass through them. Some embodiments may not contain such passages, or may contain passages which are intrinsic to a mesh, dimples which do not interrupt a bottom surface of the stitcher plate, are only present within certain layers or portions of a stitcher plate, etc. The stitcher plate may arrest the displacement of the nanofiber media 410 and macro fibers 450 in the downward direction, such as due to gravity, a force transferred by the needles, etc. Analogously, the stripper plate 430 may arrest the displacement of the nanofiber media 410 and macro fibers 450 in the upward direction, such as due to gravity, a force transferred by the needles, etc.

At least a portion of the plurality of needles may contain barbs 421 disposed along their length. The barbs may catch macro fibers 450 which are disposed within the cavity along one or more surfaces of the nanofiber media 410, and may pull the macro fibers 450 through the nanofiber media 410 to combine them into a hybrid media 460. The barbs may also pull the macro fibers 450 amongst themselves so as to entangle the macro fibers 450 to form a fiber web disposed along one or more surfaces of the nanofiber media. Some embodiments may contain barbs 421 of a geometry to primarily push rather than pull the macro fibers 450 through the nanofiber media 410. For example, some embodiments may point barbs in a downward direction.

Figure 5:
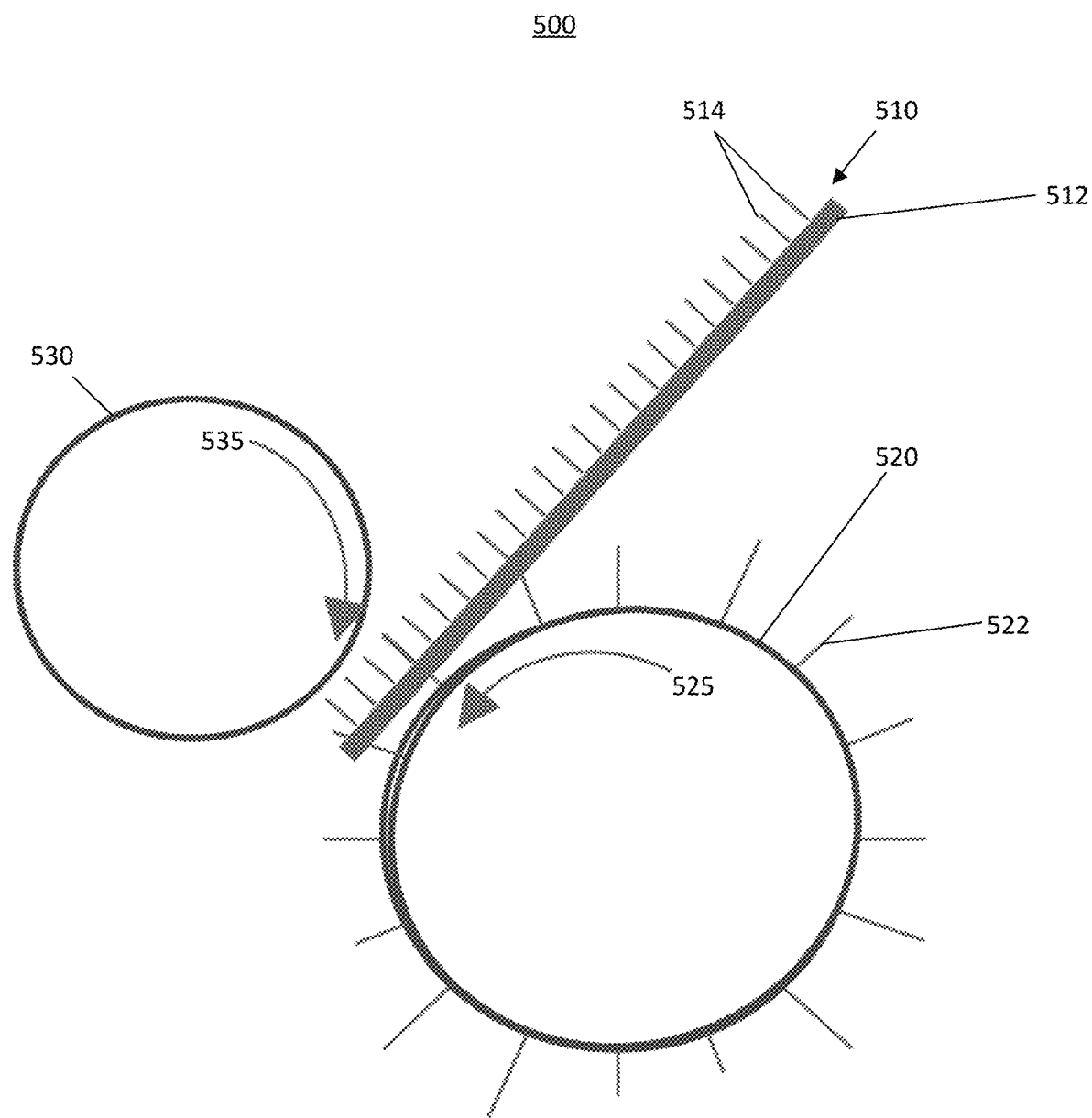
FIG. 5 is a cross sectional view of a nanofiber media passing between a licker-in drum and a second drum to perforate the nanofiber media.

FIG. 5 is a cross sectional view of a system 500 including nanofiber media 510, comprising a film 512 with a plurality of nanofibers 514 disposed along at least one surface. The nanofiber media 510 is shown passing between a licker-in drum 520, having a first direction of rotation 525, and a complementary drum 530 having a second direction of rotation 535, opposite the first. The licker-in drum 520 further comprises a plurality of needles 522 disposed along its surface. One or more drums may be rotated in a respective direction of rotation, which may cause the rotation of one or more additional drums. For example, the licker-in drum 520 may be powered in the first direction of rotation 525, which may cause the nanofiber media 510 to advance along a surface of the drum, and may also cause the rotation of the complementary drum (e.g., by the coupling of the needles 522 with the complementary drum 530, or by the force passed from the surface of the licker-in drum 520 to the complementary drum 530).

Although not depicted, a surface of the complementary drum 530 may be configured to avoid damage to the nanofibers, such as by containing recesses configured to avoid crushing the nanofibers, to receive the needles 522, etc. The nanofiber media 510 is depicted passing over the licker-in drum with a film side facing the needles 522 which may, advantageously, prevent nanofibers from adhering to the needles 522. Alternate embodiments may pass the film side along a surface of the complementary drum, which may, advantageously, avoid fouling any recesses in the complementary drum. Still further embodiments may pass a plurality of sheets of nanofiber media or film over the licker-in drum 520. Advantageously, such an embodiment may align the perforations which may increase an airflow through the plurality of sheets, and increase throughput.

Figure 6A:
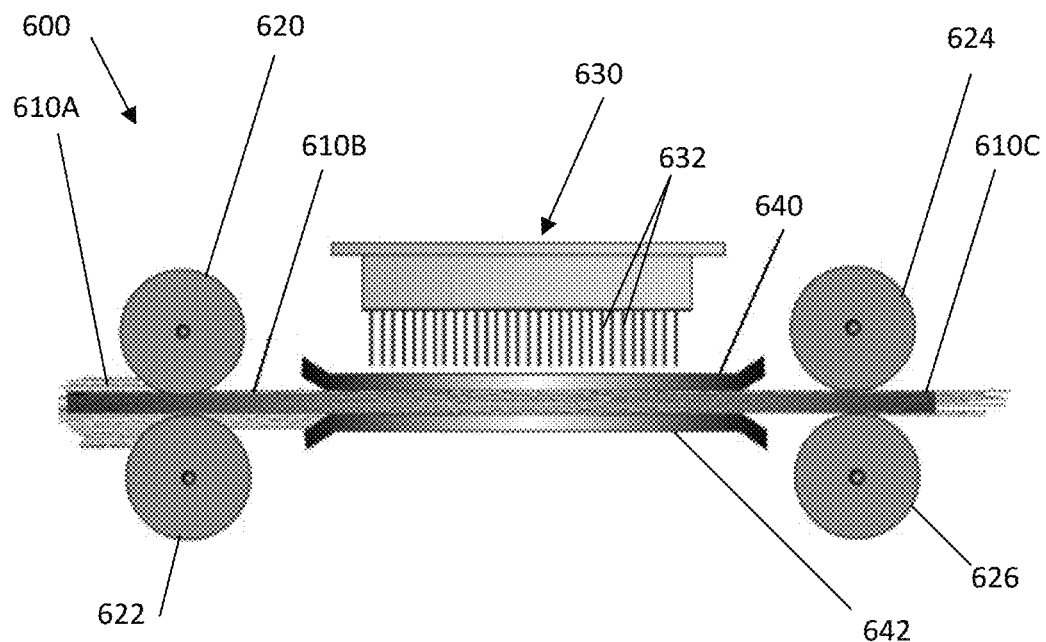
FIG. 6A is a needling assembly configured to perforate nanofiber media.

FIG. 6A is a needling assembly 600 configured to perforate nanofiber media. The needling assembly 600 is configured to receive nanofiber media 610, which may contain a plurality of layers, or may further comprise macro fibers. A feed roller 620 may pass the nanofiber media 610 towards a stripper plate 640 and stitcher plate 642 configured to receive a nanofiber media therebetween. The feed roller (and/or a complementary feed roller 622) may process the nanofiber material, such as by compacting any portion of the nanofiber media and/or preventing the passage of excessive sized fibers, debris, etc. The stripper plate 640 and stitcher plate 642 may also be configured to process the nanofiber material, such as by a tapered, beveled or bend edge to guide the material to a fixed thickness. Advantageously, such as design may also prevent binding of the nanofiber material along the edges of the plates. Indeed, in some embodiments, a nanofilm may be perforated absent additional fibers, and such plate edge geometries may avoid binding or tearing even absent macro fibers.

A needle board 630 having a plurality of needles 632 attached thereto may be configured to pass through at least one of the stripper plate 640 or the stitcher plate 642 to cause perforations therein (e.g., by a displacement of the needle board 630 or the stripper plate 640). If the feed roller(s) 620 are actively powered, the feed rollers may be synchronized with the needle board 630 such that the nanofiber media 610 is not advanced while the needles 632 are engaged with the nanofiber media 610 (e.g., to avoid tearing). A delivery roller 624 and/or and complement delivery roller 626 are disposed along a side of the stripper plate 640 opposite the feed roller 620. Any of the rollers may be a roller drum, one or a plurality of wheels, a guide bar, etc. In addition to supporting the nanofiber media 610, the delivery rollers may process the material, such that the cumulative effect of any or all of the feed roller 620, the stripper (or other) plate, and the delivery roller, may, in addition to the needling process, conform the material to a desired density, thickness, etc. For example, the nanofiber material entering the roller 610A may be of different composition and form then the nanofiber material entering the stripper plate 610B, and which may, again, be of different composition and form then the nanofiber material exiting the delivery roller 624.

As one skilled in the art will appreciate, the needling assembly 600 may be similar to the needling assembly 400 of FIG. 4. As has been discussed, infra, in some embodiments, various needling assemblies may be specialized to perforating and combining fibers, respectively, or otherwise specialized (e.g., to create various perforation patterns), and other assemblies may be configured to perform multiple operations (e.g., in sequence or simultaneously, with a modification of parts thereof or without modification, etc.). Further, the needling assembly 600 may be modified similar to the needling assembly 400 of FIG. 4 according to a particular use. For example, the needles 632 of the needling assembly 600 may be barbed or non-barbed.

Figure 6B:
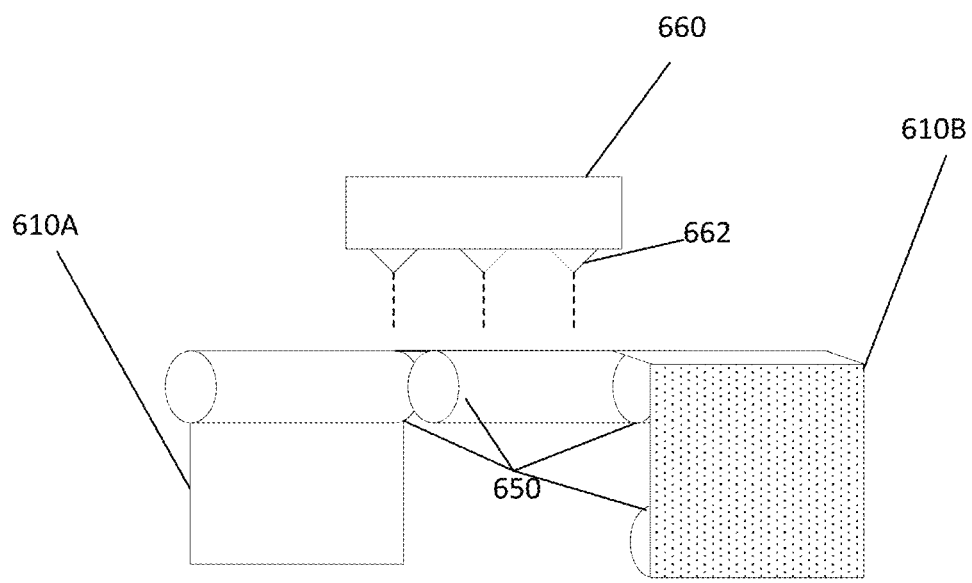
FIG. 6B is a laser ablation system configured to perforate nanofiber media.

FIG. 6B is a system configured to laser ablate nanofiber media. One or more rollers 650 are depicted passing the nanofiber media 610 (e.g., an unperforated nanofiber media 610A) under a laser ablation head 660. The laser ablation head 660 contains one or more lasers 662 which are lensed onto the nanofiber media 610 so as to perforate the material. In some embodiments, a number of lasers may be equal to the number of perforations desired on along a dimension of the nanofiber media 610. In many embodiments, fewer lasers may be present that a number of perforations desired along a dimension of the nanofiber media 610. In such embodiments, the lasers may be configured to create perforations across the nanofiber media 610. For example, the laser ablation head 660 may be mobile, or may contain a plurality of mirrors corresponding to the lasers 662 whereby the beams of the lasers 662 may be selectively steered to create perforations across the surface of the nanofiber media 610 (e.g., the laser ablation head 660 may be a galvanometer scanning head). The perforated nanofiber media 610B may proceed along one or more rollers subsequent to perforation, which may allow the perforated nanofiber media 610B to cool, and the perforated nanofiber media 610B may be stored, such as by rolling the nanofiber media 610 around one or more rollers.

In some embodiments, the perforation diameter may be adjustable, such as by adjustable lensing, an adjustable power level, or an adjustable distance between the laser ablation head 660 and the nanofiber media 610 (e.g., a movable laser ablation head 660, rollers 650, etc.).

Figure 7A:
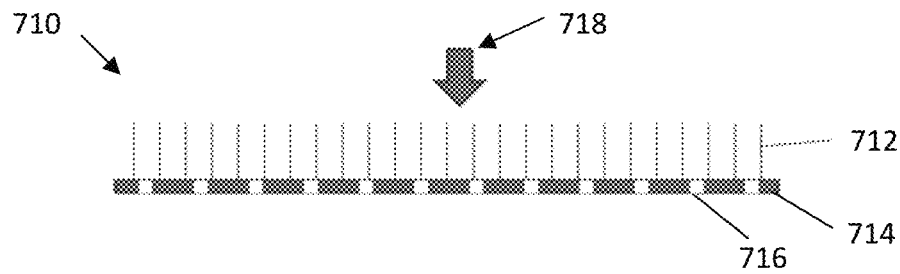
FIGS. 7A, 7B, 7C, and 7D depict various organizations of perforated nanofiber media.

FIGS. 7A-7D depict various organizations of nanofiber media. A nanofiber media 710 is depicted by FIG. 7A. The nanofiber media 710 comprises a film sheet 714 having a plurality of nanofibers 712 disposed along a surface thereof. A plurality of perforations 716 (also referred to as ventilations, herein) are disposed along the film sheet 714. The film sheet 714 and the perforations 716 may be of any shape, however, in many embodiments, the perforations 716 may be circular, and the film sheet may be generally rectangular. A direction of air travel 718 is depicted as passing towards the nanofiber 712 side of the nanofiber media 710, which may avoid shedding of nanofibers. As discussed, supra, various orientations relative to an expected airflow may be employed, such as an opposite airflow, or an airflow along a surface of the nanofiber media 710.

Figure 7B:
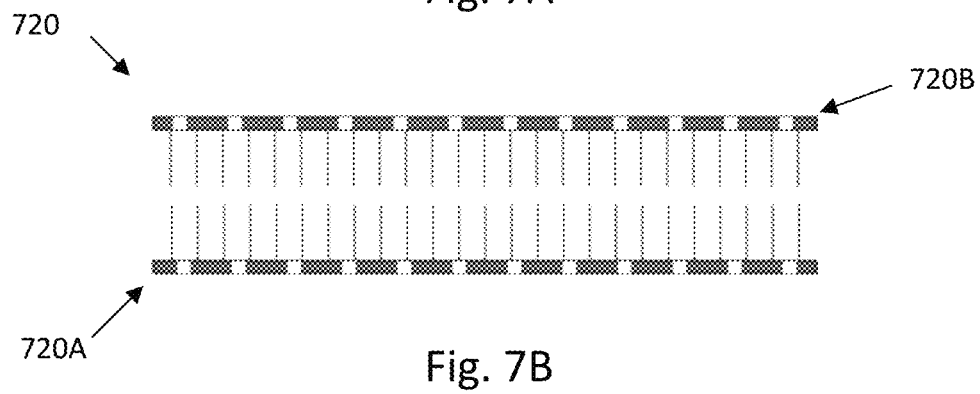

Turning to FIG. 7B, another nanofiber media 720 is depicted, comprising a first film sheet 720A and a second film sheet 720B, each film sheet having a plurality of nanofibers adhered to one surface. The first film sheet 720A and second film sheet 720B are oriented such that the nanofiber media are facing each other. In some embodiments, the two film sheets (like other embodiments using additional or fewer film sheets) may be brought into contact; in some embodiments, the two film sheets may be separated, such as by an intervening mesh layer, intervening macro fibers, etc. One skilled in the art will recognize that the nanofiber media 720 may comprise additional layers, for example, additional film sheets of various orientations, such as aligned with the first film sheet 720A and second film sheet 720B.

Figure 7C:
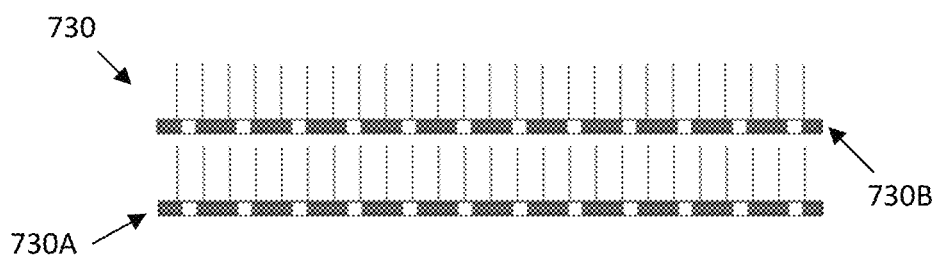

Turning to FIG. 7C, yet another nanofiber media 730 is depicted. The nanofiber media 730 comprises a third film sheet 730A and a fourth film sheet 730B, arranged to both face their fibers in an upward direction, as depicted. Such a depiction is not intended to be limiting, and indeed, the physical orientation of the nanofiber media 730 may generally be positioned as desired, both with regards to spatial position, and with respect to an expected direction of airflow. For example, the upwardly depicted direction may be a direction from which air is intended to flow, or air may flow from an opposite direction, along the surface of the fibers, etc. One skilled in the art will understand that the components described herein are intended as examples, and are not limiting. Various individual nanofibers may be included in such a filter (e.g., nanofibers harvested from a perforation process, shaved or otherwise separated from a film sheet, etc.), either in the depicted figures or in other embodiments. Indeed, unless disclaimed or impractical, the various alterations and examples disclosed herein may be practiced between the various disclosed embodiments.

Figure 7D:
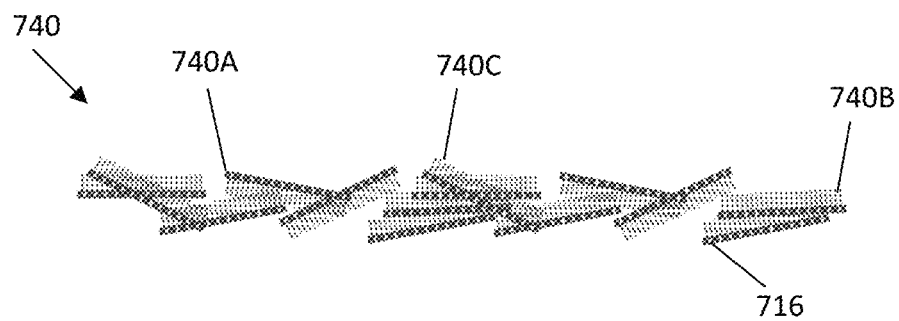

FIG. 7D depicts nanofiber media 740 comprising a plurality of randomly oriented films (e.g., 740A, 740B, 740C, etc.). Each film has nanofibers disposed along at least one surface, and a plurality of perforations 716 in the film. The plurality of films may be adhered to a surface, disposed between any of one or more mesh sheets, film sheets, macro fibers, etc. For example, the depicted films may be combined with macro fibers, which, in combination may be disposed between two mesh layers, a mesh material and a macro fiber layer sufficient to maintain the structure of the nanofiber media 740, two macro fiber layers sufficient to maintain the structure of the nanofiber media 740, etc.

In an illustrative embodiment, many of the operations described herein can be implemented at least in part as computer-readable instructions stored on a computer-readable memory. Upon execution of the computer-readable instructions by a processor, the computer-readable instructions can cause a computing system to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method operations may be varied or re-sequenced according to alternative embodiments. Other substitutions, modifications, changes and omissions may also be made in the design, operating conditions and arrangement of the various exemplary embodiments without departing from the scope of the present application. For example, any element disclosed in one embodiment may be incorporated or utilized with any other embodiment disclosed herein.

What is claimed is:
1. A method of preparing filter media comprising:
   inserting one or more layers of a nanofiber media between an upper surface and a lower surface, wherein the upper surface and the lower surface are configured to receive a first plurality of needles;
   piercing the nanofiber media with the first plurality of needles;
   withdrawing the first plurality of needles;
   aligning macro fibers along a first surface of the nanofiber media to create a hybrid media;

inserting the hybrid media between a stripper plate and a stitcher plate;
piercing the hybrid media with a second plurality of needles; and
withdrawing the second plurality of needles;
wherein at least a combination of the piercing of the hybrid media and the withdrawing from the hybrid media comprises:
catching, by the second plurality of needles, macro fibers; and
combining, by the second plurality of needles, the macro fibers with the nanofiber media.

2. The method of claim 1, wherein the second plurality of needles comprise barbs, and wherein the catching of the macro fibers is performed by the barbs.

3. The method of claim 1, wherein at least some of the second plurality of needles are also comprised with the first plurality of needles.

4. The method of claim 3, wherein the second plurality of needles comprise barbs, and wherein the catching of the macro fibers is performed by the barbs.

5. The method of claim 1, wherein additional macro fibers are placed along a second surface of the nanofiber media.

6. The method of claim 5, wherein the additional macro fibers are of a different size than the macro fibers aligned along the first surface.

7. The method of claim 5, wherein the nanofiber media, the macro fibers, and the additional macro fibers, form an air flow gradient through the filter media.

8. A method of preparing filter media comprising:
inserting one or more layers of a nanofiber media between an upper surface and a lower surface, wherein the upper surface and the lower surface are configured to receive a plurality of teeth;
piercing the nanofiber media with the plurality of teeth;
withdrawing the plurality of teeth;
aligning macro fibers along a first surface of the nanofiber media to create a hybrid media;
inserting the hybrid media between a stripper plate and a stitcher plate;
piercing the hybrid media with a plurality of needles; and
withdrawing the plurality of needles; wherein
at least a combination of the piercing of the hybrid media and the withdrawing from the hybrid media comprises:
catching, by the plurality of needles, macro fibers; and
combining, by the plurality of needles, the macro fibers with the nanofiber media.

9. The method of claim 8, wherein the plurality of teeth are disposed along an outer surface of a licker drum.

10. The method of claim 9, wherein the nanofiber media is advanced along the outer surface of the licker drum by a rotation of the licker drum.

11. The method of claim 10, wherein additional macro fibers are placed along a second surface of the nanofiber media.

12. The method of claim 11, wherein the additional macro fibers are of a different size than the macro fibers aligned along the first surface.

13. The method of claim 12, wherein the nanofiber media, the macro fibers, and the additional macro fibers, form an air flow gradient through the filter media.

* * * * *